US010054996B2

(12) United States Patent
Kim et al.

(10) Patent No.: US 10,054,996 B2
(45) Date of Patent: Aug. 21, 2018

(54) POWER SYSTEM MONITORING AND CONTROL SYSTEM HAVING THREAD-DEPENDENT CALCULATION MONITORING FUNCTION

(71) Applicant: LSIS CO., LTD., Anyang-si, Gyeonggi-do (KR)

(72) Inventors: Tae Seop Kim, Gunpo-si (KR); Jong Ho Park, Gwangmyeong-si (KR); Yong Ik Lee, Hwaseong-si (KR); Tae Ho Kim, Anyang-si (KR); Jin Hei Myung, Seoul (KR); Soon Jong Bahng, Seongnam-si (KR); Jong Kab Kwak, Yongin-si (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 445 days.

(21) Appl. No.: 14/677,796

(22) Filed: Apr. 2, 2015

(65) Prior Publication Data

US 2016/0291664 A1 Oct. 6, 2016
US 2018/0052502 A9 Feb. 22, 2018

(30) Foreign Application Priority Data

Apr. 15, 2014 (KR) .................. 10-2014-0045012

(51) Int. Cl.
*G01R 21/00* (2006.01)
*G06F 1/28* (2006.01)
*G06F 9/445* (2018.01)

(52) U.S. Cl.
CPC ............ *G06F 1/28* (2013.01); *G06F 9/44505* (2013.01)

(58) Field of Classification Search
None
See application file for complete search history.

(56) References Cited

U.S. PATENT DOCUMENTS 5,375,125 A 12/1994 Oshima et al.
5,485,073 A * 1/1996 Kasashima ........... G06F 1/1616
320/106

(Continued)

FOREIGN PATENT DOCUMENTS

CN 101814736 8/2010
CN 103164288 A 6/2013

(Continued)

OTHER PUBLICATIONS

European Patent Office Application Serial No. 151628823, Search Report dated Oct. 26, 2015, 10 pages.

(Continued)

*Primary Examiner* — Cory Eskridge
(74) *Attorney, Agent, or Firm* — K&L Gates LLP

(57) ABSTRACT

A power system monitoring and control system having a thread-dependent calculation monitoring function is provided. The power system monitoring and control system includes: a display unit displaying screen information; a calculation handling unit executing thread-dependent calculation based on a calculation expression defined in a calculation file, and performing calculation handling for generating calculation result information and thread-dependent calculation execution monitoring information to provide generated information as screen information on the display unit; and a data storage unit storing file information for power system monitoring and control, information on the calculation file, the calculation result information, and the thread-dependent calculation execution monitoring information.

9 Claims, 4 Drawing Sheets

| | Status | ScriptID | FileName | RegistUserID | Regist Time | Start Run Time | Last Run Time | Total Calc | Valid Calc | Error Calc | RMKS | Start | Pause |
|---|---|---|---|---|---|---|---|---|---|---|---|---|---|
| 11a | ⊖ | 1 | Calcscript1.cal | ems | 2014/1/15 15:45:56 | 2014/1/15 15:51:04 | 2014/1/15 15:51:03 | 6290 | 6290 | 0 | | Start | Pause |
| 11b | ⊗ | 2 | Calcscript2.cal | ems | 2014/1/15 15:45:56 | 2014/1/15 15:51:04 | 2014/1/15 15:51:04 | 6291 | 6288 | 3 | | Start | Pause |
| 11c | ⊘ | 3 | Calcscript3.cal | ems | 2014/1/15 15:46:47 | 2014/1/15 15:50:48 | 2014/1/15 15:50:48 | 6290 | 6290 | 0 | | Start | Pause |
| | ⊘ | 4 | Calcscript4.cal | Administrator | 1970/1/1 09:00:00 | 1970/1/1 09:00:00 | 1970/1/1 09:00:00 | 0 | 0 | 0 | Not Exist Compile Information | Start | Pause |

Auto Calculation Monitoring 11, 12, 13, 14, 15, 16, 17, 18, 19, 20, 21, 22, 216a, 22a, 22b

(56) References Cited

U.S. PATENT DOCUMENTS

| | | | | |
|---|---|---|---|---|
| 5,691,742 A | * | 11/1997 | O'Connor | G01R 31/3648 320/DIG. 21 |
| 6,571,153 B1 | | 5/2003 | Maeda et al. | |
| 6,691,049 B1 | * | 2/2004 | Jeansonne | G06F 1/28 320/134 |
| 8,494,661 B2 | * | 7/2013 | Ewing | H04L 12/10 700/22 |
| 2009/0234512 A1 | * | 9/2009 | Ewing | H04L 12/10 700/295 |
| 2011/0107305 A1 | * | 5/2011 | Baron | G06F 11/3664 717/125 |

FOREIGN PATENT DOCUMENTS

| | | |
|---|---|---|
| JP | H11146576 | 5/1999 |
| JP | 2000134786 | 5/2000 |
| JP | 2004-229356 | 8/2004 |
| JP | 2006-349483 | 12/2006 |
| JP | 2007300696 | 11/2007 |
| JP | 2011-234434 | 11/2011 |
| KR | 10-2007-0107455 | 11/2007 |

OTHER PUBLICATIONS

Korean Intellectual Property Office Application No. 10-2014-0045012, Office Action dated Aug. 31, 2017, 6 pages.
Chinese Office Action for related Chinese Application No. 201510259086.4; action dated Dec. 5, 2017; (6 pages).

* cited by examiner

Fig. 4

| | 11 | 12 | 13 | 14 | 15 | 16 | 17 | 18 | 19 | 20 | 21 | 22 |
|---|---|---|---|---|---|---|---|---|---|---|---|---|
| | | | | | | Auto Calculation Monitoring | | | | | | |
| | Status | ScriptID | FileName | RegistUserID | Regist Time | Start Run Time | Last Run Time | Total Calc | Valid Calc | Error Calc | RMKS | Start / Pause |
| 11a → | ◕ | 1 | Calcscript1.cal | ems | 2014/1/15 15:45:56 | 2014/1/15 15:51:04 | 2014/1/15 15:51:03 | 6290 | 6290 | 0 | | Start  Pause |
| 11b → | ◕ | 2 | Calcscript2.cal | ems | 2014/1/15 15:45:56 | 2014/1/15 15:51:04 | 2014/1/15 15:51:04 | 6291 | 6288 | 3 | | Start  Pause |
| 11c → | ◕ | 3 | Calcscript3.cal | ems | 2014/1/15 15:46:47 | 2014/1/15 15:50:48 | 2014/1/15 15:50:48 | 6290 | 6290 | 0 | | Start  Pause |
| | ◕ | 4 | Calcscript4.cal | Administrator | 1970/1/1 09:00:00 | 1970/1/1 09:00:00 | 1970/1/1 09:00:00 ← 216a | 0 | 0 | 0 | Not Exist Compile Information | Start  Pause |

22a ↘ Start    22b ↘ Pause

POWER SYSTEM MONITORING AND CONTROL SYSTEM HAVING THREAD-DEPENDENT CALCULATION MONITORING FUNCTION

CROSS-REFERENCE TO RELATED APPLICATIONS

Pursuant to 35 U.S.C. § 119(a), this application claims the benefit of earlier filing date and right of priority to Korean Application No. 10-2014-0045012, filed on Apr. 15, 2014, the contents of which are all incorporated by reference herein in their entirety.

BACKGROUND

The present disclosure relates to a power system monitoring and control system that may perform thread-dependent calculation monitoring. More particularly, the present disclosure relates to a system that enables a user to visually check a thread-dependent calculation execution state when calculation for power system monitoring and control is performed in a power system monitoring and control system. In addition, the present disclosure relates to a power system monitoring and control system having a thread-dependent calculation monitoring function that enables an action to be quickly taken when there is a trouble.

A power system monitoring and control system includes supervisory control and data acquisition (SCADA) system or an energy management system (EMS).

FIG. 1 is a block diagram of a typical power system monitoring and control system.

Referring to FIG. 1, a typical power system monitoring and control system 100 includes a calculation handling unit 110, a data storage unit 120, an input unit 130, a display unit 140, and a communication unit 150.

The calculation handling unit 110 includes an information registration unit 111, a registered-information calling unit 112, a calculation execution unit 113, a calculation result information storage handling unit 114, and a calculation result information display handling unit 115.

The power system monitoring and control system 100 includes a site acquisition point using RTU and ICCP and a calculation point calculating a new result value through necessary calculation based on an acquisition point. In addition, the acquisition point and the calculation point may be referred to as SCADA points.

Since the calculation point needs repetitive calculation in many cases for its characteristic, it is used according to particular expressions (four fundamental rules of arithmetics, logic, and user definition) regarding repetitive calculation.

The power system monitoring and control system 100 defines a calculation expression in each calculation file in order to obtain a calculation point result. The power system monitoring and control system 100 registers the calculation file having a defined calculation expression with the data storage unit 120 by using the input unit 130 and the information registration unit 111.

In addition, the system 100 calls information on a calculation file stored in the data storage unit 120 through the registered-information calling unit 112 and executes calculation according to the calculation expression defined in the calculation file of the called information by the calculation execution unit 113. In this case, threads are created to correspond to the number of registered calculation files, so many calculation operations are performed together. The threads enables simultaneous calculation by dividing about 25,000 calculation expressions into many calculation files, because it is difficult to define the calculation expressions in a single calculation file.

The system 100 stores a calculated result in the calculation result information storage handling unit 114 and processes data acquired from the site through the calculation result information display handing unit 115. In addition, the system 100 displays processed information on the display unit 140 to enable a user to know it. Thus, it is important to determine whether various calculation operations are correctly performed, but as the number of files defining a calculation expression increases, it is difficult for a user to determine through a method of checking on a console whether a calculation operation is being performed.

It is difficult for the typical power system monitoring and control system 100 to determine the presence and absence of the error of a calculation expression on a thread created for each calculation file. Since there is little information on registered calculation files and it does not appear on the screen, the user may not determine whether the calculation operation is correct. The user may view only a calculation file name on a console appearing in the calculation execution procedure and a message that the calculation operation is being performed (which is difficult to determine the match of a calculation expression defined in a file).

Also, the calculation expression defines, as a function, mathematical symbols and functions, and expressions used in power engineering. A point uploading data on the site sometimes varies in name or disappears during operation, but the typical power monitoring and control system 100 does not check regarding the name varying and the point disappearing during operation whether a point defined in calculation script is actually in operation, and does not show related content to the user.

Also, file name and account information are being written into a binary file instead of a database managed by the power system monitoring and control system 100. Also, information, such as a registration time, a calculation execution time, and number of times calculation is executed is not handled.

Thus, since it is not easy for a user to visually check a thread-dependent calculation execution state in the typical power system monitoring and control system 100, there is a limitation in that it is difficult to quickly take actions when there is a trouble.

SUMMARY

Embodiments provide a power system monitoring and control system having a thread-dependent calculation monitoring function that enables a user to visually check a thread-dependent calculation execution state when calculation for power system monitoring and control is executed in the power system monitoring and control system, and enables an action to be quickly taken when there is a trouble.

In one embodiment, a power system monitoring and control system having a thread-dependent calculation monitoring function includes: a display unit displaying screen information; a calculation handling unit executing thread-dependent calculation based on a calculation expression defined in a calculation file, and performing calculation handling for generating calculation result information and thread-dependent calculation execution monitoring information to provide generated information as screen information on the display unit; and a data storage unit storing file information for power system monitoring and control, information on the calculation file, the calculation result information, and the thread-dependent calculation execution monitoring information.

The data storage unit may include a DB including the file information for power system monitoring and control, the information on the calculation file, the calculation result information, and the thread-dependent calculation execution monitoring information.

The calculation handling unit may include: an information registration unit registering the information on the calculation file with the data storage unit; a registration information calling unit calling and reading the information on the calculation file registered with the data storage unit; a calculation execution unit performing calculation on a calculation expression defined in the calculation file of called information; a calculation result information storage handing unit enabling a result of calculation performed by the calculation execution unit to be stored in the data storage unit; a calculation result information display handing unit enabling information on the result of calculation performed by the calculation execution unit to be displayed on the display unit; and a calculation execution monitoring information display handling unit generating thread-dependent calculation execution monitoring information for monitoring of calculation execution performed by the calculation execution unit, and enabling generated information to be displayed on the display unit.

The information registration unit may form a DB in the data storage unit through information registration of the calculation file.

The information registration unit may have a thread-dependent calculation monitoring function combining an input acquisition point and a calculation point to form a calculation expression to define the calculation expression in each calculation file.

The calculation execution unit may have a thread-dependent calculation monitoring function generating a thread for each calculation file registered, to simultaneously perform calculation.

The thread-dependent calculation execution monitoring information may include information on one or more of a calculation status indication, an order of registered calculation expressions, a file name of a file in which a calculation expression being currently performed is defined, a registration account, a registration time, a time when a calculation expression starts, a time when a calculation expression ends, a number of times all calculations are performed, the number of times valid calculation is performed, the number of times erroneous calculation is performed, a notification message for registering a calculation expression, and a calculation start/stop button.

The information on the calculation status indication may include: a first calculation status indicating that calculation script is a valid operation, a second calculation status indicating a status in which calculation has not been performed because there is an operand different from a DB stored in the data storage unit among calculation expressions in calculation script which is registered with the data storage unit and is being performed; and a third calculation status indicating a status in which a calculation expression temporarily stops by a user request.

The third calculation status may include a status which is registered with the DB but in which a preliminary work enabling calculation is not ready, or a status in which calculation of calculation script is not performed by a specific condition.

The specific condition may include an erroneous operation of a thread, or execution disability of calculation script.

The information on the calculation status indication may be divided into a plurality of calculation statuses according to a ratio of the number of times all calculations are performed to the number of times erroneous calculation is performed.

The details of one or more embodiments are set forth in the accompanying drawings and the description below. Other features will be apparent from the description and drawings, and from the claims.

BRIEF DESCRIPTION OF THE DRAWINGS

FIG. 4 shows an example of a thread-dependent calculation execution monitoring screen provided in a power system monitoring and control system having a thread-dependent calculation monitoring function according to an embodiment of the present invention.

DETAILED DESCRIPTION OF THE EMBODIMENTS

Particular embodiments are described below in detail with reference to the accompanying drawings.

Figure 1:
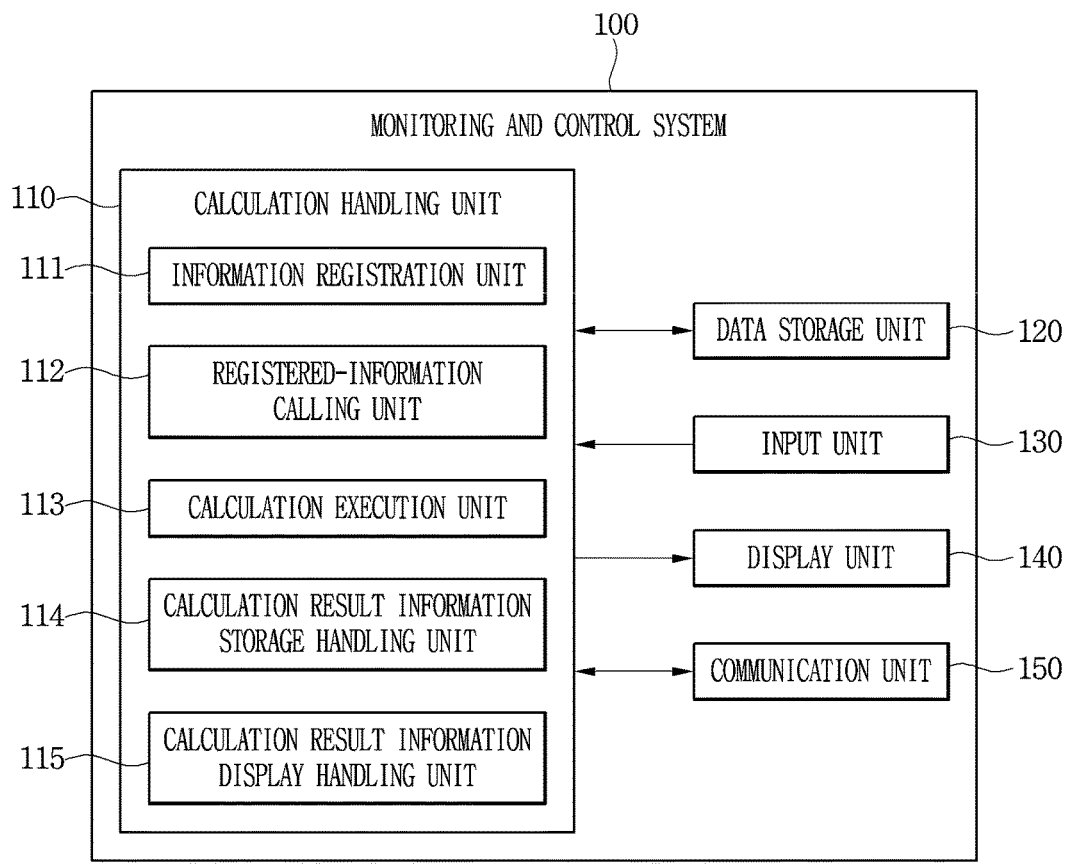
FIG. 1 is a block diagram of a typical power system monitoring and control system.
Figure 2:
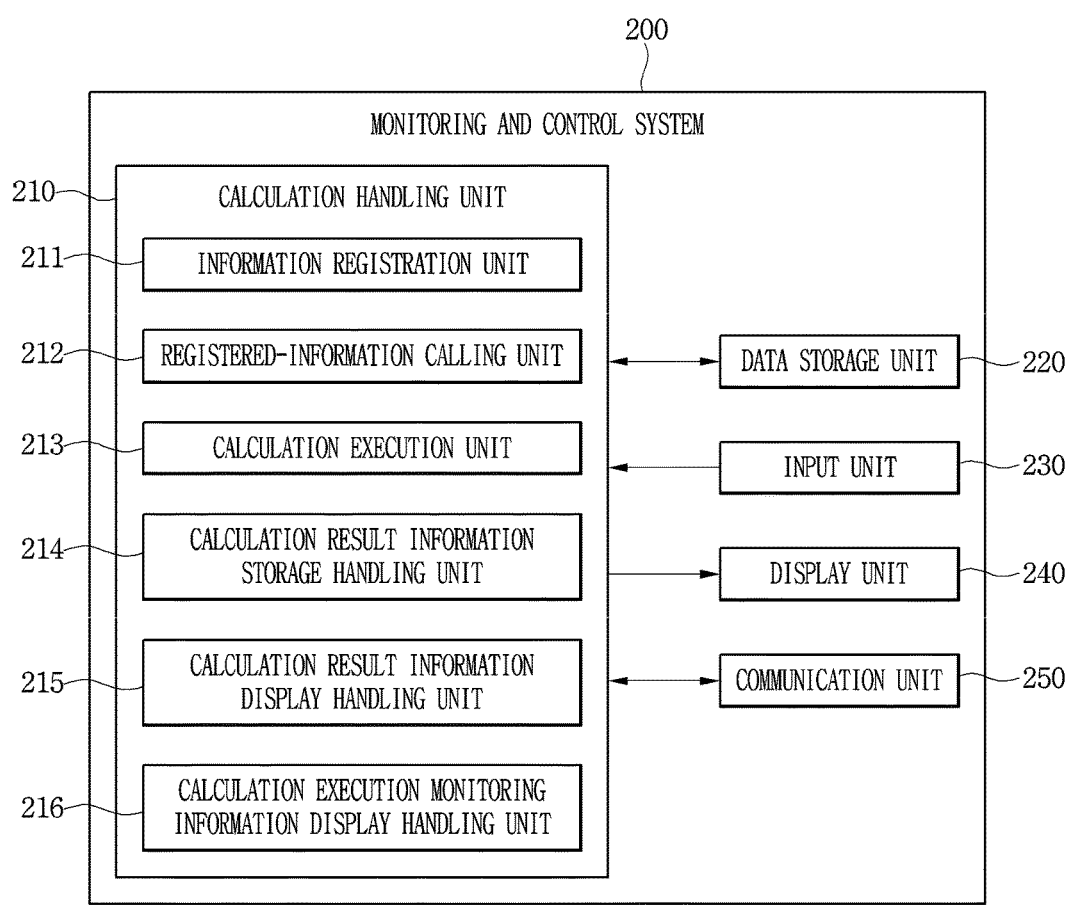
FIG. 2 is a block diagram of a power system monitoring and control system having a thread-dependent calculation monitoring function according to an embodiment of the present invention.

FIG. 2 is a block diagram of a power system monitoring and control system having a thread-dependent calculation monitoring function according to an embodiment of the present invention.

Referring to FIG. 2, a power system monitoring and control system 200 having a thread-dependent calculation monitoring function according to an embodiment of the present invention includes a calculation handling unit 210, a data storage unit 220, an input unit 230, a display unit 240, and a communication unit 250.

The calculation handling unit 210 executes thread-dependent calculation based on a calculation expression in a calculation file, and handles calculation for generating calculation result information and thread-dependent calculation monitoring information to provide generated information as screen information to the display unit 240.

The data storage unit 220 stores various pieces of file information, calculation file information, calculation result information and thread-dependent calculation execution monitoring information for the operation of the power system monitoring and control system 200. The information is stored in the form of a DB.

A calculation file includes a calculation expression defined by combining an acquisition point received from a user and a calculation point. The calculation expression defines, as a function, mathematical symbols and functions, and expressions used in power engineering.

The thread-dependent calculation execution monitoring information is information for displaying whether thread-dependent calculation is being validly performed, and may include, e.g., a calculation status indication, the order of registered calculation expressions, the file name of a file in which the calculation expression being currently performed is defined, a registration account, a registration time, a time when a calculation expression is performed (starts/ends), the number of times all calculations are performed, the number of times valid calculation is performed, the number of times erroneous calculation is performed, a notification message for registering a calculation expression, and a calculation start/stop button.

Thus, even if a point uploading data on the site varies in name or disappears during operation, it is possible to check regarding the name varying and the point disappearing during operation whether a point defined in calculation script is actually in operation. In addition, when there is a request from a user, it is possible to provide requested information to the user.

Also, since the power system monitoring and control system 200 stores calculation execution monitoring information as well as various pieces of file information for operation in the data storage unit 220, it is possible to monitor a thread-dependent calculation execution state in real time or hourly.

For example, it is possible to authenticate an erroneous point by matching a point name defined in calculation script with the name of an actual operation point stored in a database (DB). It is possible to check presence and absence by matching the name of a site operation point defined in the DB with the name of a calculation point defined in calculation script. Also, thread-dependent point validity may be authenticated.

The calculation handling unit 210 may include an information registration unit 211, a registered-information calling unit 212, a calculation execution unit 213, a calculation result information storage handling unit 214, a calculation result information display handling unit 215, and a calculation execution monitoring information display handling unit 216.

The information registration unit 211 registers, with the data storage unit 220, files in which calculation expressions are defined, and the files stored in the data storage unit 220 form a DB.

The information registration unit 211 may combine an acquisition point received from a user through the input unit 230 and a calculation point to make a calculation expression, and define as each calculation file. The information registration unit 211 may define the file name of a calculation file to register, a registration user, and expression details in binary form, in a calculation file, e.g., "regist.cfg", when a defined calculation file is registered with the data storage unit 220.

The registration information calling unit 212 calls and reads information on the registered calculation file "regist.cfg".

The calculation execution unit 213 performs calculation on a calculation file of information called by the registration information calling unit 212 and performs calculation according to a defined calculation expression in this case. The calculation file includes calculation script in which a calculation expression is defined. In this case, the calculation execution unit 213 may create a thread for each file registered and perform simultaneous calculation.

The calculation execution unit 213 may read about 25,000 calculation expressions defined in the calculation script to perform calculation.

The calculation result information storage handling unit 214 stores, in the data storage unit 220, a result of calculation performed by the calculation execution unit 213.

The calculation result information display handling unit 215 displays, on the display unit, the result of calculation performed by the calculation execution unit 213.

The calculation execution monitoring information display handling unit 216 may display, on the display unit 240, calculation execution monitoring information that a user may visually check. The calculation execution monitoring information may include a calculation execution monitoring screen that includes various pieces of information for monitoring calculation execution.

Figure 3:
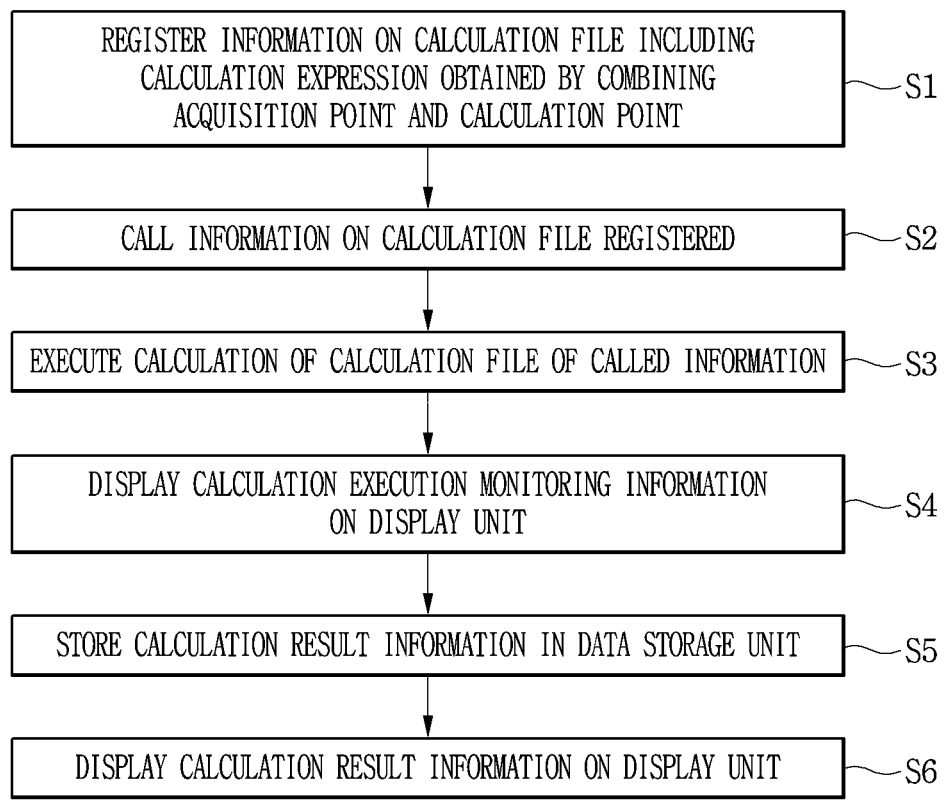
FIG. 3 is a flowchart for explaining how to execute a thread-dependent calculation monitoring function in a power system monitoring and control system having the thread-dependent calculation monitoring function according to an embodiment of the present invention.

FIG. 3 is a flowchart for explaining how to execute a thread-dependent calculation monitoring function in a power system monitoring and control system having the thread-dependent calculation monitoring function according to an embodiment of the present invention.

Referring to FIG. 3, the information registration unit 211 registers, with the data storage unit 220, information on a calculation file that includes a calculation expression defined by combining an acquisition point and a calculation point in step S1.

The registration information calling unit 212 calls information on a calculation file registered with the data storage unit 220 in step S2.

The calculation execution unit 213 executes calculation of a calculation file of information called by the registration information calling unit 212 in step S3.

The calculation execution monitoring information display handling unit 26 displays, on the display unit 240, calculation execution monitoring information in step S4.

The calculation execution monitoring information display handling unit 216 may display, regarding calculation files registered with the data storage unit 220, a registration file name, a registration account, a registration time, a time when calculation is performed, the number of all calculation expressions defined in a file, and the number of calculation expressions having errors while calculation is performed, on the display unit 240 to provide to a user a notification that calculation is being correctly performed.

Thus, a user may check the number of errors displayed on the display unit 240 when there are expressions having errors while calculation is performed, and thus quickly solve the limitation.

The calculation result information storage handling unit 214 enables calculation result information to be stored in the storage unit 220 in step S5.

Then, the calculation result information display handling unit 215 displays calculation result information on the display unit 240 in step S6.

FIG. 4 shows an example of a thread-dependent calculation execution monitoring screen provided in a power system monitoring and control system having a thread-dependent calculation monitoring function according to an embodiment of the present invention.

Referring to FIG. 4, a calculation execution monitoring screen 216*a* may include a calculation status indication 11, the order of registered calculation expressions 12, the file name 13 of a file in which the calculation expression being currently performed is defined, a registration account 14, a registration time 15, a time 16 when a calculation expression starts, a time 17 when a calculation expression ends, the number of times all calculations are performed 18, the number of times valid calculation is performed 19, the number of times erroneous calculation is performed 20, a notification message 21 for registering a calculation expression, and a calculation start/stop button 22.

The calculation status indication 11 may display a calculation execution status. Information on the calculation status indication may be divided into a plurality of calculation statuses according to the ratio of the number of times all calculations are performed to the number of times erroneous calculation is performed.

For example, it is possible to indicate green 11a, orange 11b and red 11c according to the ratio of the number of times all calculations are performed to the number of times erroneous calculation is performed.

For example, when the ratio of the number of times all calculations are performed to the number of times erroneous calculation is performed is 10% or higher, it is determined that there is a trouble and thus the color of the calculation status indication 11 may be changed from green to red.

Also, information on the calculation status indication may be divided into a plurality of calculation statuses according to the presence and absence of a calculation execution operation.

For example, the green 11a may indicate that currently registered calculation script is a valid operation. The orange 11b may indicate a status in which calculation has not been performed because there is an operand different from a DB stored in the data storage unit 220 among calculation expressions in registered calculation script being performed. The red 11c may indicate a status in which a calculation expression temporarily stops by a user request. The status indicated by the red 11c may include, e.g., a status which has been registered with the DB but in which a preliminary work enabling calculation has not been ready. The status indicated by the red 11c may include, e.g., a status in which the calculation of calculation script has not been performed by a specific condition. In this case, an example of the specific condition may include the erroneous operation of a thread or the execution disability of calculation script.

According to the present invention, it is possible for a user to monitor in real time whether each calculation file registered with a power system monitoring and control system is being correctly performed, and to quickly take actions where there is a trouble.

Also, even if a point uploading data on the site varies in name or disappears during operation, it is possible to check regarding the name varying and the point disappearing during operation whether a point defined in calculation script is actually in operation.

Also, when there is a request from a user, it is possible to provide requested information to the user.

Also, since various pieces of file information for the operation of the power system monitoring and control system and thread-dependent calculation execution monitoring information are stored in the data storage unit in the form of a DB, it is possible to monitor a thread-dependent calculation execution state hourly.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A power system monitoring and control system comprising:
   a display unit configured to display screen information;
   a calculation handling unit containing a calculation execution unit, a calculation monitoring unit, an information registration unit, and a database, the database storing a calculation file and information on power system monitoring and control;
   wherein the calculation handling unit is configured to:
      execute, by the calculation execution unit, thread-dependent calculation based on the calculation file, wherein the calculation file is created from an acquisition point and a calculation point,
      monitor, by the information registration unit using a monitoring function, the input acquisition point and the calculation point in the calculation file,
      generate, by the calculation monitoring unit, thread-dependent calculation execution monitoring information to be displayed on the display unit,
      generate calculation result information; and
      transmit the calculation result information and the thread-dependent calculation execution monitoring information to the display unit to display the calculation result information and the thread-dependent calculation execution monitoring information on the display unit,
   wherein the thread-dependent calculation execution monitoring information is displayed on the display unit as a calculation execution monitoring screen,
   the calculation execution monitoring screen includes information on one or more of a calculation status indication, an order of registered calculation formulas, a file name of a file in which a calculation formula being currently performed is defined, a registration account, a registration time, a time when the calculation formula starts, a time when the calculation formula ends, a number of which all calculations are performed, a number of which valid calculation is performed, a number of which erroneous calculation is performed, a notification message for registering the calculation formula, and a calculation start/stop button, and
   the one or more of calculation status indication are displayed as different colors to indicate a calculation execution status according to a ratio of the number of erroneous calculations to the number of all calculations.

2. The power system monitoring and control system according to claim 1, wherein the database stores the calculation result information and the thread-dependent calculation execution monitoring information.

3. The power system monitoring and control system according to claim 1, wherein the calculation handling unit comprises:
   the information registration unit registering the information on the calculation file with the database;
   a registration information calling unit calling and reading the information on the calculation file registered with the data storage unit;
   a calculation result information storage handling unit enabling a result of calculation performed by the calculation execution unit to be stored in the data storage unit; and
   a calculation result information display handling unit enabling information on the result of calculation performed by the calculation execution unit to be displayed on the display unit.

4. The power system monitoring and control system according to claim 3, wherein the information registration unit forms the database through information registration of the calculation file.

5. The power system monitoring and control system according to claim 3, wherein the calculation execution unit has a thread-dependent calculation monitoring function generating a thread for each calculation file registered, to simultaneously perform calculation.

6. The power system monitoring and control system according to claim 3, wherein the information on the one or more calculation status indication comprises:
   a first calculation status indicating that calculation script is a valid operation,
   a second calculation status indicating a status in which calculation has not been performed because there is an operand different from that in the database in calculation script which is registered with the database and is being performed; and
   a third calculation status indicating a status in which the calculation temporarily stops by a user request.

7. The power system monitoring and control system according to claim 6, wherein the third calculation status comprises a status which is registered with the database but in which a preliminary work enabling calculation is not ready, or a status in which calculation of calculation script is not performed by a specific condition.

8. The power system monitoring and control system according to claim 7, wherein the specific condition comprises an erroneous operation of a thread, or execution disability of the calculation script.

9. The power system monitoring and control system according to claim 1, wherein the information on the one or more of calculation status indication is divided into a plurality of calculation statuses according to the ratio of the number of erroneous calculations to the number of all calculations.

* * * * *